United States Patent [19]

Hatherly

[11] 3,925,540
[45] Dec. 9, 1975

[54] PRODUCTION OF CHLORINE DIOXIDE

[76] Inventor: David G. Hatherly, 14 Regina Place, St. Johns, Newfoundland, Canada

[22] Filed: Sept. 30, 1974

[21] Appl. No.: 510,607

Related U.S. Application Data

[63] Continuation of Ser. No. 150,600, June 7, 1971, abandoned.

[30] Foreign Application Priority Data

June 10, 1970 Canada .................................. 85091

[52] U.S. Cl. ................ 423/478; 423/475; 423/487; 423/499; 423/500; 423/504; 423/580; 423/648
[51] Int. Cl.² .................. C01B 11/02; C01B 11/14; C01B 1/02; C01B 7/01
[58] Field of Search .......... 423/478, 479, 504, 505, 423/500, 475, 648

[56] References Cited
UNITED STATES PATENTS

| | | |
|---|---|---|
| 2,765,215 | 10/1956 | Pechukas et al. .................... 423/478 |
| 2,936,219 | 5/1960 | Rapson .............................. 423/478 |
| 3,404,952 | 10/1968 | Westerlund ......................... 423/478 |
| 3,594,580 | 7/1971 | Westerlund ...................... 423/478 X |
| 3,829,557 | 8/1974 | Winfield .......................... 423/504 X |

*Primary Examiner*—Edward Stern
*Attorney, Agent, or Firm*—Sim & McBurney

[57] ABSTRACT

Chlorine dioxide is formed by reaction between an alkali metal chlorate and hydrochloric acid in aqueous reaction medium in a reaction zone. Water is evaporated from the reaction medium and removes the chlorine dioxide and chlorine from the reaction zone. The reaction medium is formed by electrolyzing an aqueous solution of an alkali metal chloride to form an aqueous solution of an alkali metal chlorate and hydrogen, the alkali metal chlorate being fed to the reaction zone. Hydrogen chloride is formed by reaction of approximately one-third of the mole amount of the hydrogen and chlorine and fed to the reaction zone. Water is also fed to the reaction zone.

12 Claims, 1 Drawing Figure

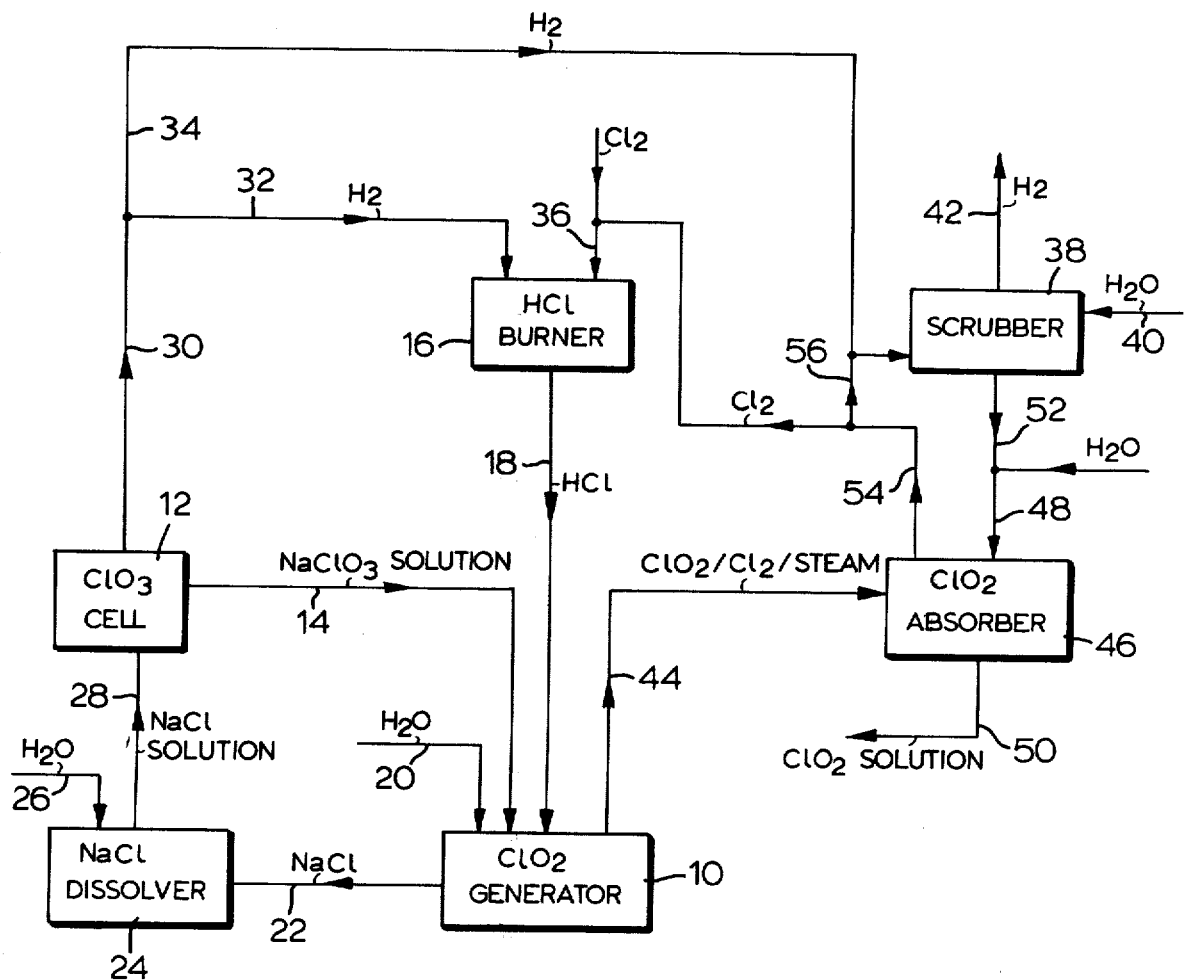

PRODUCTION OF CHLORINE DIOXIDE

This is a continuation of application Ser. No. 150,600, filed June 7, 1971, now abandoned.

This invention relates to the production of chlorine dioxide, more particularly to the production of chlorine dioxide from hydrochloric acid-based systems.

Chlorine dioxide is known to be prepared in a variety of ways, involving the reduction of an alkali metal chlorate, generally sodium, utilizing sulphur dioxide, sulphuric acid, chromic sulphate, methanol, sodium chloride and hydrochloric acid as reducing agents. The basic reaction in all such processes is that between chlorate and chloride in the acid solution to produce chlorine dioxide, chlorine and water in accordance with the equation:

$HClO_3 + HCl \rightarrow ClO_2 + \frac{1}{2} Cl_2 + H_2O$

The present invention is concerned with the process of making chlorine dioxide where the reducing agent is hydrochloric acid. The basic reactions involved are, in the case where the alkali metal is sodium:

$NaClO_3 + 2HCl \rightarrow ClO_2 + \frac{1}{2}Cl_2 + NaCl + H_2O$ (1)

and $NaClO_3 + 6 HCl \rightarrow NaCl + 3Cl_2 + 3H_2O$ (2)

The two reactions are competing in the reaction solution and reaction (2) becomes significant in cases when there is an excess of hydrochloric acid above the stoichiometry of the reaction (1) in the feed to the reactor. Where such an excess of hydrochloric acid exists, therefore, the quantity of chlorine dioxide produced per mole of sodium chlorate decomposed is reduced. In order to maximize chlorine dioxide production, it is preferred to operate at or near the stoichiometry of equation (1) in the feed to the reactor.

Chlorine dioxide has been produced commercially from hydrochloric acid by the so-called Day-Kesting process disclosed in Canadian Pat. No. 461,586 issued Dec. 6, 1947 to Brown Company. In this process the chlorine dioxide generator consists of a plurality of, generally six, reaction vessels arranged in series. Feed liquor containing sodium chlorate, hydrochloric acid and some sodium chloride is fed to the uppermost of the six reactors, from which the solution cascades by gravity through the remaining reactors. The two bottom reactors are operated at boiling temperature and the steam strips them of chlorine dioxide while the remaining hydrochloric acid is oxidized. Air is introduced into the gas stream from the last two reactors, mixes with the vapour and is bubbled counter-currently through the solution in the reactors three to six.

It has previously been proposed in Canadian Pat. No. 782,574 issued Apr. 9, 1968 to Chemech Engineering Limited, to produce chlorine dioxide and chlorine from sodium chloride and hydrochloric acid in a single reaction vessel in place of the cascade six-vessel system used in the Day-Kesting process. In the process described in the above patent, gaseous hydrogen is passed through the reaction vessel to agitate the reaction liquor and as gaseous diluent for the chlorine dioxide and chlorine.

Chlorine dioxide gas in concentrated amounts is spontaneously explosive and in processes of producing chlorine dioxide it is necessary to make some provision for diluting the gases produced in the reaction. Air has commonly been used as in the Day-Kesting operation described above and in the process of Canadian Pat. No. 782,574, hydrogen is the diluent gas.

The process of Canadian Pat. No. 782,574 involves integration of the chlorine dioxide generator with a sodium chlorate cell. The product of the reaction is sodium chloride and the effluent from the chlorine dioxide generator contains sodium chloride as well as unreacted sodium chlorate and hydrochloric acid. This effluent is fed to the chlorate cell wherein at least part of the sodium chloride is converted to sodium chlorate by electrolysis. The solution enriched in sodium chlorate then is returned to the chlorine dioxide generator.

Hydrogen is formed as a by-product of the electrolysis reaction. This gas stream is reacted with chlorine to generate the hydrogen chloride requirement of the chlorine dioxide generator. The hydrogen off-gas from the chlorate cell generally contains minor amounts of chlorine formed by electrolysis of the hydrochloric acid in the cell. This chlorine is combusted in the hydrogen chloride generator.

The main reaction involved in the chlorate cell is:

$NaCl + 3H_2O \rightarrow NaClO_3 + 3H_2$ and the reaction involved in producing hydrogen chloride is:

$H_2 + Cl_2 \rightarrow 2HCl$

It will be seen from the above equation (1) that only two moles of hydrogen chloride (as hydrochloric acid in the reaction medium) is required for each mole of sodium chlorate. Therefore, only one-third of the mole quantity of hydrogen produced in the chlorate cell need be combusted with one mole of chlorine to produce the required mole amount of hydrogen chloride, and thereby ultimately the stoichiometric mole amount of hydrochloric acid.

In the process of Canadian Pat. 782,574, the excess hydrogen in the hydrogen chloride may be passed through the chlorine dioxide generator as diluent gas for the chlorine dioxide and chlorine. After absorption of chlorine dioxide from the gas mixture, the chlorine and hydrogen are fed to the hydrogen chloride burner.

Operation in this manner leads to a build-up of large amounts of hydrogen in the system. Gas mixtures containing chlorine dioxide, chlorine and hydrogen may explode, although the risk of explosion is reduced with regard to that where undiluted chlorine dioxide is involved. With larger amounts of hydrogen the extent of damage possible through such an explosion is increased.

In order to attempt to control the quantity of hydrogen passing through the chlorine dioxide generator, in the process of Canadian Pat. No. 782,574, a quantity of the gas mixture of hydrogen chloride and hydrogen from the hydrogen chloride combustor is bled from the materials forwarded to the chlorine dioxide generator. The bled mixture is contacted with water to scrub the hydrogen chloride content and the hydrogen gas is vented from the system.

The hydrochloric acid is forwarded to the chlorine dioxide generator. However, forwarding such hydrochloric acid causes further problems since the water content of the hydrochloric acid dilutes the chemicals. Little or no water is evaporated in the chlorine dioxide generator so that the quantity of excess water in the system is built up.

As a solution to this problem, in Canadian Pat. No. 782,574, most of the hydrochloric acid formed is not forwarded to the generator. Since less than the stoichiometric hydrogen chloride requirement is now being fed to the generator, it is necessary to produce more hydrogen chloride. While this reduces the quantity of hydrogen to be bled off, it nevertheless increases the chlorine requirement of the system. As a by-product, the hydrochloric acid not forwarded to the generator is collected. In effect, as well as producing chlorine dioxide, the process described in Canadian Pat. No. 782,574 produces hydrochloric acid from chlorine. This may be extremely undesirable in areas where there is limited availability of chlorine and in areas where there is no economic manner of disposal of the hydrochloric acid.

The process of the present invention provides a system integrating a chlorine dioxide generator and a chlorate cell which does not suffer from the defects of the process of Canadian Pat. No. 782,574 discussed above. In the process of the present invention, the only effluents are chlorine dioxide solution and hydrogen and the only feed streams required are chlorine and water.

The present invention employs steam to remove the chlorine dioxide and chlorine from the generator in place of the hydrogen of the process of Canadian Pat. No. 782,574. The use of steam to remove the chlorine dioxide and chlorine in place of hydrogen substantially eliminates the possibility of explosion of the gas mixtures.

A generator of this type is described in Canadian Pat. No. 913328. In practice, the alkali metal chlorate generally is sodium chlorate and the generator generally is maintained at the boiling temperature of the solution. Operating at the boiling temperature ensures maximum vaporization from the reaction solution, whereby the product chlorine dioxide and chlorine are rapidly educted from the generator. It is preferred to maintain the temperature in the vessel at a temperature of around 60° to 80°C and a reduced pressure is maintained at these temperatures to bring about boiling.

The acidity of the reacting solution is fairly low, generally below about 1N, preferably about 0.5N. An effective range of acidities is about 0.05 to 1N.

In accordance with the present invention, the off-gas hydrogen, possibly containing some chlorine, from the chlorate cell is not all forwarded to the hydrogen chloride burner but only approximately the stoichiometric amount is forwarded. In practice a small excess of hydrogen is preferred so as to ensure complete combustion of the chlorine. The presence of free chlorine in the chlorine dioxide generator reacting solution tends to inhibit the reaction. Excess quantities of about 2% generally are employed. In addition, the excess hydrogen will serve to react with any small quantities of oxygen present in the hydrogen stream or the chlorine stream.

The present invention is further described by way of example with reference to the accompanying drawing which is a flow sheet illustrating one embodiment of the invention.

A chlorine dioxide generator 10 contains a boiling aqueous reaction medium of sodium chlorate and hydrochloric acid. The generator may take several forms and one suitable is described in Canadian Pat. No. 825,084 issued Oct. 14, 1969 to Electric Reduction Company of Canada, Limited, modified as required.

The process of the invention is described with mainly reference to sodium salts, but it is understood the invention is applicable to other alkali metal salts, such as potassium salts.

Sodium chlorate solution is fed to the generator 10 from a chlorate cell 12 through line 14. The hydrogen chloride requirement is fed to the generator 10 from a hydrogen chloride burner 16 through line 18. Water is added to the generator 10 by line 20.

Alternatively, aqueous hydrochloric acid may be fed to the generator 10 by absorbing the hydrogen chloride gas in line 18 in water prior to passage to the generator. It is preferred to feed gaseous hydrogen chloride to the generator so that the heat of reaction from the burner and the heat of solution of hydrogen chloride in water may be used as part of the heat requirement of the generator. Cooling water for a hydrochloric acid plant is thereby eliminated and the steam load in the generator is reduced.

The generator 10 is maintained under reduced pressure by means not shown. Typical generator conditions are 60°C at 150 to 200 mm Hg.

The generator 10 evaporates sufficient water from the reaction medium that product sodium chloride precipitates out in the generator. Any overflow liquor is recycled to the sodium chlorate input line 14. It is preferred, however, to maintain the level of the reacting liquor in the generator 10 at a substantially constant level. This may be achieved by controlling the quantity of water evaporated in the generator.

Alternatively, the generator 10 may be operated in such a manner that the product sodium chloride is not precipitated. In this embodiment, all of the effluent from the generator is forwarded to the chlorate cell.

The sodium chloride is removed from the generator 10 and passed by line 22, preferably after washing to remove entrained reaction liquor, to a sodium chloride dissolver 24. Where washing of the sodium chloride takes place, the spent wash water may be passed to waste or preferably returned to the generator 10.

Water fed through line 26 to the dissolver 24 dissolves the sodium chloride to form a sodium chloride solution which is passed by line 28 to the chlorate cell 12. Preferably the minimum quantity of water is employed to dissolve the sodium chloride. The sodium chloride is electrolyzed in the chlorate cell 12 to form sodium chlorate and hydrogen. The sodium chlorate solution is passed by line 14 to the generator 10.

The hydrogen, possibly containing small quantities of chlorine, especially in the embodiment where no sodium chloride is precipitated in the generator and all of the effluents are passed to the chlorate cell 12, passes out of cell 12 by line 30. It is preferred to feed substantially pure sodium chloride solution to the chlorate cell rather than overflow effluent from the generator, since side reactions are minimized with the substantially pure sodium chloride solution, and cell efficiency is thereby increased.

The cell 12 may be of any well known construction and capable of electrolyzing sodium chloride solution to sodium chlorate and hydrogen, in accordance with the equation:

$$NaCl + 3H_2O \rightarrow NaClO_3 + 3H_2$$

The hydrogen stream 30 is split into two streams, one in line 32 and one in line 34. The stream is split so that approximately one-third of the mole quantity of hydrogen is in line 32 and the remainder in line 34. The hydrogen in line 32 is passed to the hydrogen chloride burner 16 for conversion to hydrogen chloride by burning with chlorine fed through line 36. The hydrogen chloride formed is passed to the generator 10 through line 18.

It is preferred that there be a slight stoichiometric excess of hydrogen in line 32 to ensure complete reaction of the chlorine. The hydrogen chloride in line 18 therefore may contain very minor amounts of unreacted hydrogen.

The hydrogen in line 34 may be vented directly to atmosphere. Where such hydrogen contains chlorine gas, the gas is preferably first fed to a scrubber 38 wherein it is contacted with water fed through line 40 to dissolve out the chlorine. The hydrogen gas freed of chlorine then may be vented to atmosphere through line 42.

Alternatively, the hydrogen in line 42 or in line 34 may be burned with oxygen, to produce heat to balance energy values, and water which may be used as part of the water requirement of the system. Alternatively, the hydrogen and oxygen may be fed to a fuel cell and electrical energy recovered thereby. In this way, operating economies may be effected.

The burner 16 may be replaced by a fuel cell to which the hydrogen in line 32 and the chlorine in line 36 are fed. Hydrogen chloride and electrical power are obtained.

The gaseous products of the generator 10 consisting essentially of chlorine dioxide, chlorine and steam are passed through line 44 to a chlorine dioxide absorber 46. Water is fed to the absorber 46 through line 48 to condense at least part of the water vapour and to dissolve the chlorine dioxide. The liquid effluent of the absorber 46 leaving through line 50 is as aqueous chlorine dioxide solution containing some dissolved chlorine and is suitable for use as feed for a chlorine dioxide bleaching operation, wherein a pulp of cellulosic fibrous material is contacted therewith.

The water fed through line 48 may consist partially of weak chlorine water obtained as effluent from the scrubber 48 in line 52.

The chlorine gas from the absorber 46 containing some water vapor passes through line 54 to the chlorine feed line 36 of the burner 16. Part of the chlorine in line 54 may be passed to the hydrogen line 34 by line 56. This serves to control the quantity of hydrogen being recycled to the generator. Where a stoichiometric excess of hydrogen is fed to the hydrogen chloride burner, albeit minor, the excess will continuously recycle and build up as in the process of Canadian Pat. No. 782,574 where the problem is much more acute.

Therefore, bleed off of recycle chlorine also bleeds recycle excess hydrogen. The chlorine is not lost to the system since it is recovered in line 52 as an aqueous solution. Using chlorine water in place of pure water to absorb the chlorine dioxide does not appreciably alter the chlorine content of the chlorine dioxide solution in line 50.

It will be seen that the process of the present invention overcomes the practical problems associated with the process of Canadian Pat. No. 782,574. Firstly, since steam is used to remove the chlorine dioxide and chlorine from the generator, the possibility of explosion is substantially minimized. Secondly, since the excess hydrogen is bled off before feed to the hydrogen chloride burner, the build up of excess hydrogen in the system is avoided. Thirdly, gaseous hydrogen chloride may be fed directly to the generator thereby effecting thermal economies. Fourthly, since water is evaporated in the generator, no problems of water imbalance are encountered. Fifthly, no stoichiometric excess of chlorine is required leading to the formation of by-product hydrochloric acid.

The process employs as raw materials chlorine and water and the products are chlorine dioxide solution, and hydrogen. However, as described above, the hydrogen may be used to produce energy and water, for the process.

Modifications are possible within the scope of the present invention.

What I claim is:

1. A method of forming chlorine dioxide which includes:

electrolyzing an aqueous solution of an alkali metal chloride to form an alkali metal chlorate and hydrogen in accordance with the equation:
    $$MCl + 3H_2O \rightarrow MClO_3 + 3H_2$$
    where M is an alkali metal, providing said formed alkali metal chlorate as an aqueous solution thereof and forwarding said aqueous solution to a reaction zone, separating said hydrogen into a first stream containing approximately one-third of the mole of quantity of said hydrogen and a second stream containing approximately two-thirds of the mole quantity of said hydrogen, recovering said second stream of hydrogen, reacting the hydrogen in said first stream thereof with chlorine to form hydrogen chloride in accordance with the equation:
    $$H_2 + Cl_2 \rightarrow 2HCl,$$

forwarding said hydrogen chloride to said reaction zone to provide with said forwarded aqueous solution of alkali metal chlorate an aqueous reaction medium in said reaction zone containing alkali metal chlorate and hydrochloric acid, controlling the quantity of hydrochloric acid present in said reaction medium to provide an acidity of about 0.05 to below 1 normal therein, heating the aqueous reaction medium to an elevated temperature corresponsing to its boiling point at the absolute pressure of said reaction zone and below the temperature above which substantial decomposition of chlorine dioxide occurs, effecting reaction between said alkali metal chlorate and hydrochloric acid in said reaction medium at said elevated temperature while maintaining said reaction zone under subatmospheric pressure to form chlorine dioxide and chlorine predominantly in accordance with the equation:
    $$MClO_3 + 2HCl \rightarrow ClO_2 + \tfrac{1}{2}Cl_2 + MCl + H_2O$$
    where M is an alkali metal, evaporating water from said reaction medium at said elevated temperature and forming in said reaction zone a gaseous admixture consisting essentially of said formed chlorine dioxide and chlorine and evaporated water, removing said gaseous admixture from said reaction zone, saturating said reaction medium with alkali metal chloride formed in said chlorine dioxide and chlorineproducing reaction and thereafter depositing alkali metal chloride from said reaction medium in said reaction zone.

2. The method of claim 1 including forming an aqueous solution of said chlorine dioxide present in said removed gaseous admixture.

3. The method of claim 1 carried out continuously and wherein said alkali metal is sodium.

4. The method of claim 3 including separating the chlorine present in said removed gaseous admixture substantially completely therefrom, forming an aqueous solution of said chlorine dioxide in said removed gaseous admixture, and utilizing said separated chlorine as at least part of said chlorine reacting with the hydrogen in said first stream to form hydrogen chloride.

5. The method of claim 3 including removing said sodium chloride from said reaction zone, forming an aqueous solution thereof, and utilizing said aqueous solution thereof as the aqueous solution electrolyzed to form the sodium chlorate and hydrogen.

6. The method of claim 4 including removing said sodium chloride from said reaction zone, forming an aqueous solution thereof, and utilizing said aqueous solution thereof as the aqueous solution electrolyzed to form the sodium chlorate and hydrogen.

7. The method of claim 1 including reacting the hydrogen in said second stream with oxygen to form water.

8. A cyclic continuous method of forming chlorine dioxide which includes:
electrolyzing an aqueous solution of an alkali metal chloride to form an alkali metal chlorate and hydrogen in accordance with the equation:
$$MCl + 3H_2O \rightarrow MClO_3 + 3H_2$$
where M is an alkali metal,
providing said formed alkali metal chlorate as an aqueous solution thereof and continuously forwarding said aqueous solution to a reaction zone,
continuously separating said hydrogen into a first stream containing slightly in excess of one-third of the mole quantity of said hydrogen and a second stream containing the remainder of the mole quantity of said hydrogen,
continuously recovering said second stream of hydrogen,
reacting the one-third mole quantity of hydrogen in said first stream thereof with chlorine to form hydrogen chloride in accordance with the equation:
$$H_2 + Cl_2 \rightarrow 2HCl$$
and provide said slightly excess quantity of hydrogen associated with said hydrogen chloride,
continuously forwarding said hydrogen chloride and slightly excess quantity of hydrogen to said reaction zone to provide with said continuously forwarded aqueous solution of alkali metal chlorate an aqueous reaction medium in said reaction zone containing an alkali metal chlorate and hydrochloric acid,
continuously maintaining the acidity of said reaction medium at about 0.05 to below about 1 normal,
continuously controlling the feeds of said alkali metal chlorate and hydrogen chloride to said reaction zone to provide approximately 2 moles of hydrogen chloride for each mole quantity of alkali metal chlorate fed to said reaction zone,
continuously maintaining said reaction medium at its boiling point at the absolute pressure of said reaction zone, said boiling point being at an elevated temperature below that above which substantial decomposition of chlorine dioxide occurs,
continuously effecting reaction between said alkali metal chlorate and hydrochloric acid in said reaction medium at said elevated temperature while said reaction zone is maintained under a subatmospheric pressure continuously to form chlorine dioxide and chlorine predominantly in accordance with the equation:
$$MClO_3 + 2HCl \rightarrow ClO_2 + \tfrac{1}{2}Cl_2 + MCl + H_2O$$
where M is an alkali metal,
continuously evaporating water from said reaction medium at said elevated temperature to maintain the liquid level in said reaction zone substantially constant and forming in said reaction zone a gaseous admixture consisting essentially of said formed chlorine dioxide and chlorine, evaporated water and said slightly excess quantity of hydrogen,
continuously removing said gaseous admixture from said reaction zone,
continuously depositing alkali metal chloride from said reaction medium in said reaction zone once the alkali metal chloride saturates the reaction medium at said elevated temperature upon initial commencement of the process,
continuously recovering said chlorine dioxide in said removed gaseous admixture, and
continuously separating said slightly excess quantity of hydrogen from said removed gaseous admixture substantially free from chlorine dioxide and chlorine.

9. The process of claim 8 wherein said recovery of chlorine dioxide and separating of said slightly excess quantity of hydrogen are carried out by continuously contacting said gaseous admixture with an aqueous material to condense said evaporated water and to form an aqueous solution of the chlorine dioxide present in said gaseous admixture and a gaseous stream containing said slightly excess quantity of hydrogen and at least a substantial quantity of the chlorine content of said gaseous admixture and continuously separating said slightly excess quantity of hydrogen from said chlorine.

10. The process of claim 9 wherein said separating of said slightly excess quantity of hydrogen from said chlorine is carried out by continuously dividing said gaseous stream into two streams, mixing one of said latter streams containing a quantity of hydrogen equivalent to said slightly excess quantity of hydrogen with said second stream of hydrogen, continuously scrubbing the resulting combined stream to dissolve the chlorine therefrom and to provide a combined hydrogen stream containing said slightly excess quantity of hydrogen, continuously utilizing the resulting chlorine solution as part of the aqueous material used in contacting said gaseous admixture, utilizing the chlorine in the other of said latter streams and containing a recycled quantity of hydrogen as at least part of the chlorine reacting with the hydrogen of the first stream to provide the hydrogen chloride associated with an excess quantity of hydrogen including recycled hydrogen and said slightly excess quantity of hydrogen.

11. The process of claim 10 wherein said alkali metal is sodium and including removing said deposited sodium chloride from said reaction zone, forming an aqueous solution thereof, and utilizing the latter aqueous solution as said electrolyzed aqueous solution of alkali metal chloride.

12. The process of claim 10 including reacting the hydrogen in said combined hydrogen stream with oxygen to form water.

* * * * *